US012064968B2

(12) United States Patent
Atake et al.

(10) Patent No.: US 12,064,968 B2
(45) Date of Patent: Aug. 20, 2024

(54) WIPING DEVICE, LIQUID DISCHARGING DEVICE, AND WIPING METHOD

(71) Applicants: Takumi Atake, Tokyo (JP); Yohta Sakon, Kanagawa (JP)

(72) Inventors: Takumi Atake, Tokyo (JP); Yohta Sakon, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 101 days.

(21) Appl. No.: 17/759,358

(22) PCT Filed: Mar. 17, 2021

(86) PCT No.: PCT/IB2021/052199

§ 371 (c)(1),
(2) Date: Jul. 22, 2022

(87) PCT Pub. No.: WO2021/186352

PCT Pub. Date: Sep. 23, 2021

(65) Prior Publication Data

US 2023/0114406 A1 Apr. 13, 2023

(30) Foreign Application Priority Data

Mar. 19, 2020 (JP) ................................ 2020-048959

(51) Int. Cl.
*B41J 2/165* (2006.01)

(52) U.S. Cl.
CPC ................................ *B41J 2/16535* (2013.01)

(58) Field of Classification Search
CPC ...................... B41J 2/16535; B41J 2002/1655
See application file for complete search history.

(56) References Cited

U.S. PATENT DOCUMENTS

| | | | | |
|---|---|---|---|---|
| 7,131,171 | B2 * | 11/2006 | Miyamoto | A61F 13/15707 28/112 |
| 7,303,808 | B2 * | 12/2007 | Taneichi | A61F 13/5123 428/152 |
| 11,179,940 | B2 * | 11/2021 | Bannai | B41J 2/16535 |
| 2014/0292911 | A1 | 10/2014 | Kajimoto et al. | |
| 2014/0292919 | A1 | 10/2014 | Kobayashi et al. | |
| 2016/0009093 | A1 | 1/2016 | Andrew et al. | |
| 2018/0264821 | A1 | 9/2018 | Sato et al. | |

(Continued)

FOREIGN PATENT DOCUMENTS

| | | |
|---|---|---|
| CN | 104070812 | 10/2014 |
| CN | 108621582 | 10/2018 |

(Continued)

OTHER PUBLICATIONS

International Search Report issued on May 28, 2021 in PCT/IB2021/052199 filed on Mar. 17, 2021.

(Continued)

*Primary Examiner* — Geoffrey S Mruk
(74) *Attorney, Agent, or Firm* — Grüneberg and Myers PLLC

(57) ABSTRACT

A wiping device includes a wiping member configured to wipe a nozzle surface of a discharging head configured to discharge a liquid composition from nozzles formed on the nozzle surface. The wiping member contains fiber with projections present in a cross section perpendicular to an axis of the fiber and continuous in a direction of the axis of the fiber.

20 Claims, 4 Drawing Sheets

(56) References Cited

U.S. PATENT DOCUMENTS

| | | | |
|---|---|---|---|
| 2018/0264822 | A1 | 9/2018 | Tanioku et al. |
| 2019/0283430 | A1 | 9/2019 | Atake |
| 2019/0366721 | A1 | 12/2019 | Ohkura et al. |
| 2020/0009871 | A1 | 1/2020 | Matsuoka et al. |
| 2020/0164650 | A1 | 5/2020 | Bannai et al. |
| 2020/0164652 | A1 | 5/2020 | Akiko et al. |
| 2020/0171832 | A1 | 6/2020 | Akima et al. |
| 2020/0207096 | A1 | 7/2020 | Horie et al. |
| 2020/0207099 | A1 | 7/2020 | Sakon et al. |
| 2020/0254472 | A1 | 8/2020 | Tanaka et al. |
| 2022/0379619 | A1* | 12/2022 | Tanaka ................. C09D 11/102 |
| 2022/0389254 | A1* | 12/2022 | Tanaka ................... C09D 11/36 |

FOREIGN PATENT DOCUMENTS

| | | |
|---|---|---|
| CN | 110271289 | 9/2019 |
| CN | 110682687 | 1/2020 |
| JP | 2004-202773 | 7/2004 |
| JP | 2008-168528 | 6/2006 |
| JP | 2009-192761 | 8/2009 |
| JP | 2012-040693 | 3/2012 |
| JP | 2012-092457 | 5/2012 |
| JP | 2014-188900 | 10/2014 |
| JP | 2014-195934 | 10/2014 |
| JP | 2016-209274 | 12/2016 |
| JP | 2018-154123 | 10/2018 |
| JP | 2019-209680 | 12/2019 |
| WO | 01/61083 A1 | 8/2001 |
| WO | 2019/058744 | 3/2019 |

OTHER PUBLICATIONS

Japanese Office Action dated Dec. 19, 2023, in Japanese Patent Application No. 2020-048959, 3 pages.

Japanese Office Action dated Aug. 29, 2023, in Japanese Application No. 2020-048959, 3 pages.

Chinese Office Action dated Jul. 1, 2023, in Chinese Patent Application No. 202180019832.6, 9 pages.

Chinese Office Action dated Feb. 8, 2024, in Chinese Application No. 202180019832.6, 12 pages.

Japanese Office Action dated Apr. 16, 2024, in Japanese Patent Application No. 2020-048959, 3 pages.

* cited by examiner

WIPING DEVICE, LIQUID DISCHARGING DEVICE, AND WIPING METHOD

CROSS-REFERENCE TO RELATED APPLICATIONS

This application is the National Stage entry under § 371 of International Application No. PCT/IB2021/052199, filed on Mar. 17, 2021, and which claims the benefit of priority to Japanese Application No. 2020-048959, filed on Mar. 19, 2020. The content of each of these applications is hereby incorporated by reference in its entirety.

TECHNICAL FIELD

The present disclosure relates to a wiping device, a liquid discharging device, and a wiping method.

BACKGROUND ART

Foreign matter on a nozzle surface in a liquid discharging device represented by an inkjet printer causes a problem such as defective discharging; the nozzle surface requires regular cleaning. Cleaning a nozzle surface with a wiping member formed by combining a sheet-shaped wiping member represented by non-woven fabric and woven fabric is already known to public.

A wiping device has been proposed in PLT 1 which relatively moves a liquid spraying head for spraying a liquid dispersion in which solid particles are dispersed in liquid against a wiping member to wipe off the liquid dispersion adhering to a nozzle surface. This wiping member has a first layer and a second layer. The first layer is disposed between the second layer and a nozzle surface.

The first layer guides liquid droplets as the dispersion medium of the liquid dispersion that adheres to the nozzle surface to the second layer owing to the capillary action and has a void capable of capturing and holding the dispersoid of the liquid dispersion. The second layer absorbs the dispersion medium.

CITATION LIST

Patent Literature

[PTL 1]

Japanese Unexamined Patent Application Publication No. 2014-188900

SUMMARY OF INVENTION

Technical Problem

However, it involves a problem of insufficient wiping in an attempt to remove dried sticky matter of a liquid composition from a nozzle surface.

Solution to Problem

The present disclosure relating to claim 1 is a wiping device including a wiping member The present disclosure of the specification describes a wiping device including a wiping member configured to wipe the nozzle surface of a discharging head for discharging a liquid composition from nozzles formed on the nozzle surface and includes fiber with projections present in a cross section perpendicular to the axis of the fiber and continuous in a direction of the axis of the fiber.

Advantageous Effects of Invention

The wiping member of the present disclosure has an excellent effect of enhancing wiping ability of removing dried adhesion of a liquid composition from a nozzle surface.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

Figure 1:
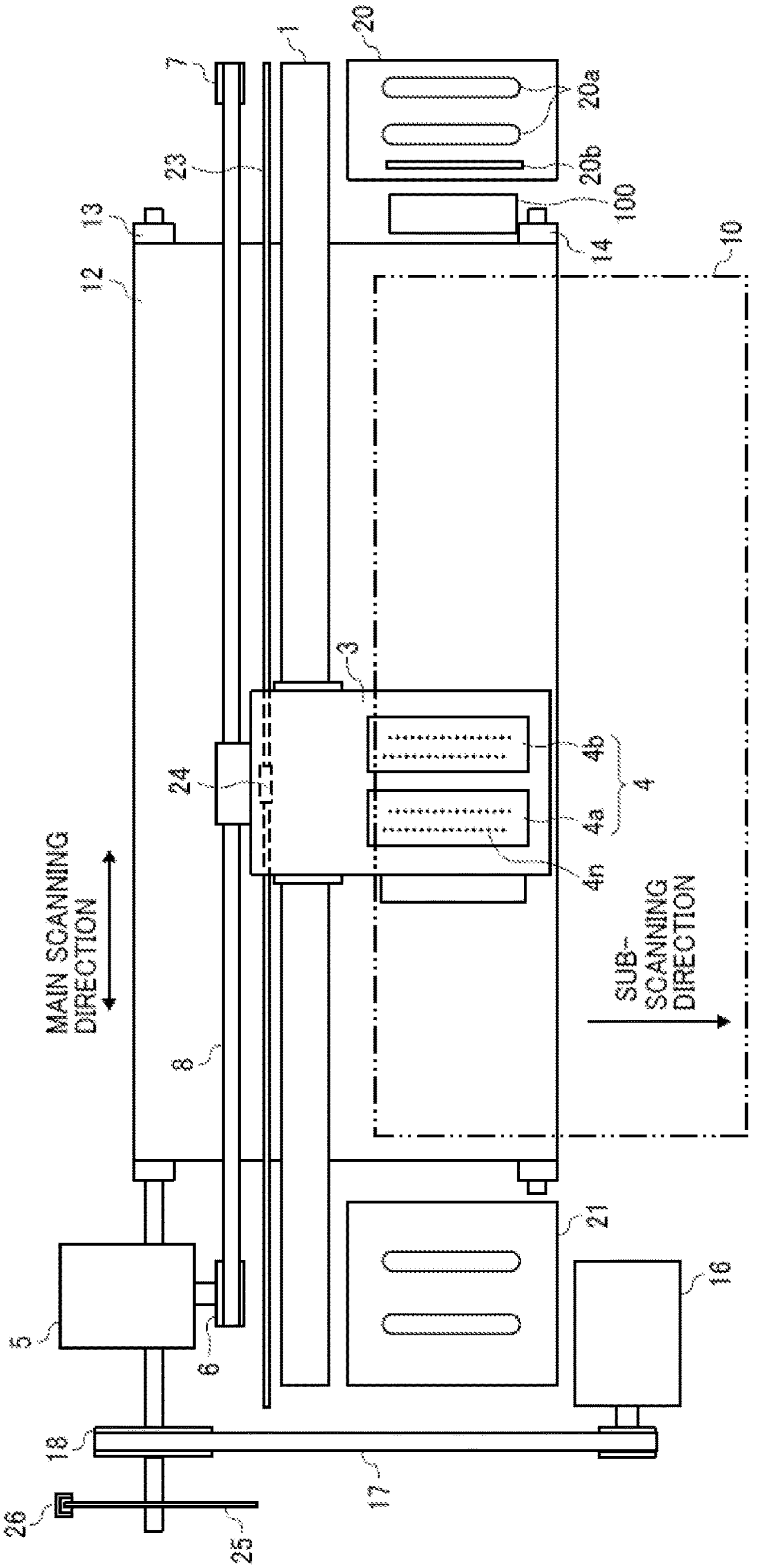
FIG. 1 is a schematic diagram illustrating an example of an image forming device incorporating a wiping device.

The terminology used herein is for the purpose of describing particular embodiments only and is not intended to be limiting of the present invention. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Next, aspects of embodiments of the present disclosure are described.

Liquid Discharging Device, Wiping Device, and Wiping Method

The liquid discharging device includes a liquid discharging head for discharging a liquid composition through a nozzle, a wiping device, and other optional devices such as devices relating to feeding, conveying, and ejecting a recording medium and devices referred to as a pre-processing device and a post-processing device. The wiping device includes a wiping member and others such as an optional device for applying liquid on a necessity basis. The wiping method executed by the liquid discharging device including a wiping device includes wiping a nozzle surface and other optional processes such as applying a cleaning liquid. The wiping device causes the wiping member to contact the nozzle surface of a liquid discharging head for discharging a liquid from nozzles to wipe the nozzle surface. Wiping refers to relative moving of the wiping member against a liquid discharging head while the wiping member is in contact with the nozzle surface. Wiping the nozzle surface with the wiping member makes it possible to remove dried sticky matter such as a dried liquid composition from the nozzle surface. It is possible to remove extra liquid composition overflowing from the nozzle by absorbing it from the nozzle surface.

Figure 2:
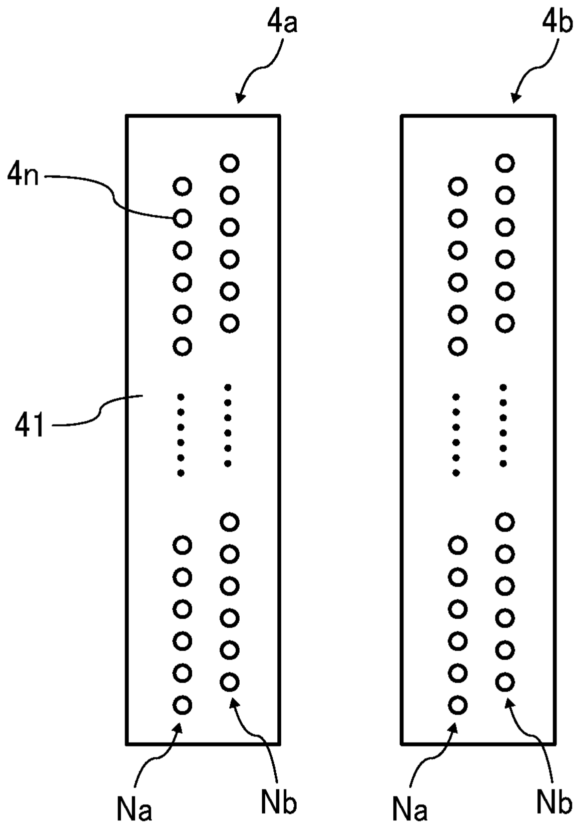
FIG. 2 is a schematic diagram illustrating an example of the nozzle surface of a liquid discharging head.
Figure 3:
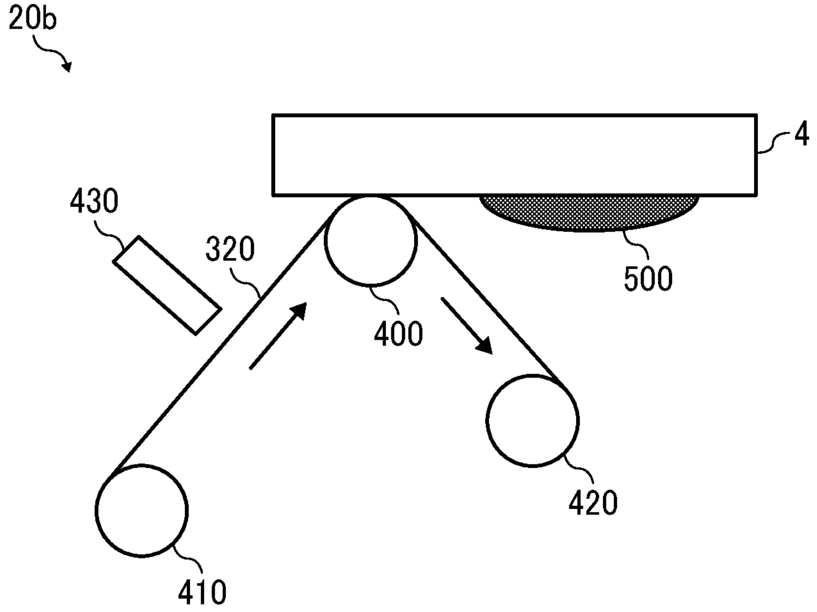
FIG. 3 is a schematic diagram illustrating an example of a wiping device.

With reference to FIGS. 1 to 3, the liquid discharging device and the wiping device are described taking an image forming device (a printing device that executes a printing method described later) as an example, which is one of the liquid discharging devices incorporating a wiping device. The image forming device discharges ink as an example of the liquid composition and can be suitably incorporated in, for example, an apparatus such as a printer/facsimile machine, a photocopier, a multifunction peripherals (serving as a printer, a facsimile machine, and a photocopier), and a solid freeform fabrication device (3D printer, additive manufacturing device, etc.). FIG. 1 is a schematic diagram illustrating an example of an image forming device incorporating a wiping device. FIG. 2 is a schematic diagram illustrating an example of the nozzle surface of a liquid discharging head. FIG. 3 is a schematic diagram illustrating an example of the wiping device.

The image forming device illustrated in FIG. 1 is a serial type liquid discharging device. The image forming device includes a carriage 3 which is movably held by a main guide member 1 and a sub-guide member, that are bridged between the left and right side plates. A main scanning motor 5 drives the carriage 3 to reciprocate in the main scanning direction (carriage moving direction) via a timing belt 8 stretched around a drive pully 6 and a driven pully 7. The carriage 3 carries recording heads 4*a* and 4*b* (referred to as recording head 4 if distinction thereof is not necessary) as examples of the liquid discharging heads. The recording head 4 discharges color ink droplets of, for example, yellow (Y), cyan (C), magenta (M), and black (K). The recording head 4 carries nozzle arrays, each having multiple nozzles 4*n* disposed along the sub-scanning direction vertical to the main scanning direction with the ink discharging direction downward.

As illustrated in FIG. 2, the recording head 4 includes two nozzle arrays Na and Nb, each including multiple nozzles 4*n* on a nozzle surface 41. As the discharging head constituting the recording head 4, for example, it is possible to use a piezoelectric actuator such as a piezoelectric element and a thermal actuator that utilizes the phase change caused by film boiling of liquid by using an electric heat conversion element such as a heat element. The recording head 41 preferably has a water-repellent film on the surface. Such a water-repellent film prevents forming of an ink residual or dried ink residual around the nozzle, thereby enhancing dischargeability. The water-repellent film represents a film having a water-repellency with a contact angle of pure water of 60 degrees or greater. The contact angle is measured by the θ/2 method.

The image forming device illustrated in FIG. 1 has a conveyor belt 12 serving as a conveying device to convey a sheet 10 by electrostatic adsorption at the position facing the recording head 4. The conveyor belt 12 takes an endless form and stretched around a conveyor roller 13 and a tension roller 14. The conveyor belt 12 is moved around in the sub-scanning direction by the conveyor roller 13 rotationally driven by a sub-scanning motor 16 via a timing belt 17 and a timing pully 18. This conveyor belt 12 is charged (charges are applied) by a charging roller while circulating.

At one end in the main-scanning direction of the carriage 3, a maintenance and recovery assembly 20 configured to maintain and recover the recording head 4 is disposed lateral to the conveyor belt 12. On the other end, a dummy discharging receiver 21 configured to receive dummy discharging by the recording head 4 is disposed lateral to the conveyor belt 12. The maintenance and recovery assembly 20 includes, for example, a capping member 20*a* to cap the nozzle surface (surface on which the nozzle is formed) 41 of the recording head 4, a wiping assembly 20*b* for wiping the nozzle surface 41, and the dummy discharging receiver 21 that receives droplets not used for image forming.

Further, the image forming device includes an encoder scale 23 that has a predetermined pattern and is stretched between both side plates along the main scanning direction of the carriage 3. Further, the carriage 3 includes an encoder sensor 24 formed of a transmission type photo sensor that reads the pattern of the encoder scale 23. These encoder scale 23 and the encoder sensor 24 constitute a linear encoder (main scanning encoder) that detects the moving of the carriage 3.

In addition, a code wheel 25 is mounted onto the shaft of the conveyor roller 13, and an encoder sensor 26 is provided which has a transmissive photosensor that detects the pattern formed on the code wheel 25. These code wheel 25 and encoder sensor 26 constitute a rotary encoder (sub-scanning encoder) that detects the moving and the position of the conveyor belt 12.

In the image forming device having such a configuration, the sheet 10 is fed onto the charged conveyor belt 12, adsorbed thereto, and conveyed along the sub-scanning direction in accordance with the rotation of the conveyor belt 12. By driving the recording head 4 in response to an image signal while moving the carriage 3 in the main-scanning direction, ink droplets are discharged onto the sheet 10 standing still to record an image in an amount of one line. After the sheet 10 is conveyed in a predetermined amount, the next line is recorded. On receiving a signal indicating that the recording is finished or the rear end of the sheet 10 has reached the image recording region, the recording operation stops and the sheet 10 is ejected to an ejection tray.

In addition, the carriage 3 is moved to the maintenance and recovery assembly 20 in the printing (recording) standby mode to clean the recording head 4 by the maintenance and recovery assembly 20. Alternatively, the recording head 4 may not be moved and the maintenance and recovery assembly 20 may move to clean the recording head 4. The recording head 4 illustrated in FIG. 1 has two nozzle arrays Na and Nb, each including multiple nozzles 4*n*, as illustrated in FIG. 2. The nozzle array Na of the recording head 4*a* discharges black (K) liquid droplets and the other nozzle array Nb discharges cyan (C) liquid droplets. The nozzle array Na of the recording head 4*b* discharges magenta (M) liquid droplets and the other nozzle array Nb discharges yellow (Y) liquid droplets.

An example of the wiping device is the wiping assembly 20*b* for wiping the nozzle surface 41. As illustrated in FIG. 3, the wiping assembly 20*b* includes a sheet-like wiping member 320, which is an example of the wiping member, a delivery roller 410 for delivering the sheet-like wiping member 320, a cleaning liquid application device 430 as an example of the cleaning liquid application device for applying a cleaning liquid to the sheet-like wiping member 320 delivered, a pressing roller 400 as an example of a pressing device for pressing the sheet-like wiping member 320 to which the cleaning liquid has been applied against the nozzle surface 41, and a reel-up roller 420 that collects the sheet-like wiping member 320 used for wiping. The cleaning liquid is supplied from a cleaning liquid storage container that stores the cleaning liquid via a cleaning liquid supply tube having a pump for supplying the cleaning liquid in the middle. Other than the sheet-like wiping member 320, the wiping assembly 20*b* for wiping the nozzle surface 41 may optionally include optional items such as a rubber blade for wiping the nozzle surface 41. The pressing roller 400 uses a spring to adjust the distance between the cleaning unit and the nozzle surface 41, thereby adjusting the pressing force. The pressing member is not limited to a roller but can be a fixed member made of plastic or rubber. When the wiping assembly 20*b* has a rubber blade, an assembly for bringing the rubber blade into contact with the sheet-like wiping member 320 may be provided to clean the rubber blade. Although it is preferable that the sheet-like wiping member 320 be reeled up in a roll form as illustrated in FIG. 3 to save the space, the sheet-like wiping member 320 is not limited thereto and can be folded. The cleaning liquid applying device is not limited to the cleaning liquid dripping device; it includes a cleaning liquid applying roller for applying the cleaning liquid with a roller and a cleaning liquid applying spray for applying the cleaning liquid with a spray. Further, the cleaning liquid application executed by the cleaning liquid application device is not particularly limited as long as the cleaning liquid can be applied to the nozzle surface 41. In addition to the indirect cleaning liquid application process via the wiping member as in the embodiment described above, it is possible to directly apply the cleaning liquid to the nozzle surface 41; however, indirect application via the wiping member is preferable.

The pressing member brings the wiping member into contact with the nozzle surface when the wiping member wipes the nozzle surface as described above. The line pressure at the contact portion between the wiping member and the nozzle surface is preferably 1.7 N/cm or less, more preferably 1.5 N/cm or less, further preferably 1.0 N/cm or less, further more preferably 0.8 N/cm or less, and particularly preferably 0.6 N/cm or less. A line pressure of 1.7 N/cm or less at the contact portion between the wiping member and the nozzle surface prevents degradation of discharging performance owing to damage to the nozzle surface during removing when the wiping member removes dried sticky matter of the liquid composition from the nozzle surface. In general, wiping property deteriorates when the line pressure at the contact portion between a wiping member and a nozzle surface is 1.7 N/cm or less; however, a wiping member having the fiber with projections described later as the fiber constituting the wiping member is used, deterioration of the wiping property is minimized. Such fiber makes it possible to set the line pressure at the contact portion between a wiping member and a nozzle surface at 1.7 N/cm or less so that degradation of discharging performance and wiping property is prevented. In the case of a discharging head having a water-repellent film on the nozzle surface, deterioration of discharging stability caused by damage to a nozzle surface worsens.

It is thus more preferable to use the wiping member of the present embodiment. The line pressure at the contact portion between the wiping member and the nozzle surface is preferably 0.1 N/cm or more, more preferably 0.2 N/cm or more, and further preferably 0.3 N/cm or more. A line pressure at the contact portion between the wiping member and the nozzle surface of 0.1 N/cm or more enhances wiping property.

The line pressure at the contact portion between the wiping member and the nozzle surface is measured when the wiping member wipes the nozzle surface as described above. It is possible to indirectly measure the line pressure by a device reproducing the positional relationship between the wiping member and the nozzle surface when the wiping member wipes the nozzle surface. The line pressure at the contact portion between a wiping member and a nozzle surface preferably means the highest line pressure of all the line pressures at the contact portion between the wiping member and the nozzle surface. In other words, the line pressure is preferably 1.7 N/cm or less at all the positions of the wiping member; however, it is not necessary to measure the line pressure at all of the contact portions. When the line pressure is 1.7 N/cm or less at any of multiple places at random at the contact portion of the wiping member and the nozzle surface, it is suitable to determine that the line pressure is 1.7 N/cm or less at all of the contact portions between the wiping member and the nozzle surface on a basis of the measuring result.

The method for measuring a line pressure is not particularly limited. One way of the measuring methods is to directly measure a line pressure using an actual machine incorporating a wiping member with a surface pressure measuring system (I-SCAN, manufactured by NITTA Corporation) and a pressure measuring film (PRESCALE, manufactured by Fujifilm Corporation). Another way is to measure the load at the biting amount equivalent to that of an actual machine and the contact length with a wiping member by using only a unit and calculate the line pressure.

In the present embodiment, a cleaning liquid is applied to a wiping member in a predetermined amount and then the recording head 4 and the wiping assembly 20*b* relatively move to each other while a wiping member is pressed against the nozzle surface 41 to wipe off foreign matter 500 adhering to the nozzle surface 41. Examples of the foreign matter 500 adhering to the nozzle surface 41 include, but are not limited to, mist ink produced during discharging of the ink from the nozzles 4*n*, ink adhering to the nozzle surface 41 when the ink is sucked from the nozzles 4*n* during cleaning, sticky ink residual which is dried mist ink or dried ink adhering to a cap member on the nozzle surface 41, and paper dust produced from printed matter. In the present embodiment, the foreign matter 500 is wiped off after the cleaning liquid is applied to the wiping member because it does not contain the cleaning liquid; however, using a wiping member containing a cleaning liquid in advance obviates the need for a cleaning liquid applying device. Moreover, the cleaning liquid can be applied to a portion other than the wiping member; it is possible to apply a cleaning liquid directly to the nozzle surface 41. The cleaning liquid applied to a nozzle surface means all the types of cleaning liquids applied to the nozzle surface. For example, it includes a cleaning liquid directly applied to a nozzle surface and a cleaning liquid indirectly applied to a nozzle surface via a wiping member containing the cleaning liquid.

The latter is preferable to the former. Furthermore, if the ink is assumed to be dried and adhere to a nozzle surface after a long standby period of time, a configuration is preferable which can wipe the nozzle surface multiple times with a wiping member containing a cleaning liquid to remove dried sticky ink. It is also possible to wipe the nozzle surface without using a cleaning liquid.

Wiping Member

Figure 4:
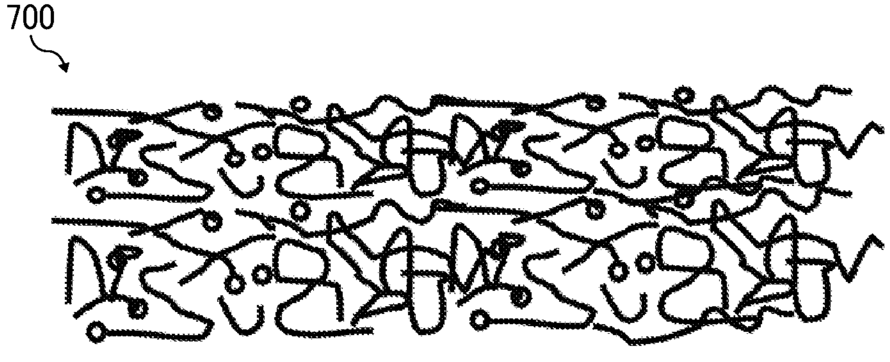
FIG. 4 is a schematic diagram illustrating an example of the cross section of a sheet-like wiping member.

Next, the wiping member will be described with reference to FIG. 4. FIG. 4 is a schematic diagram illustrating an example of the cross section of the wiping member having a sheet-like form. A wiping member 700 illustrated in FIG. 4 has a structure formed of a single layer of unwoven fabric but may have two or more layers of unwoven fabric. A configuration having a line-backed film is suitable to prevent strike-through of an absorbed liquid composition or enhance the strength of a wiping member.

The wiping member is formed of materials containing fiber such as unwoven fabric, woven fabric, and cloth. It is preferable to use a non-woven fabric because the thickness and porosity can be relatively readily controlled and various types of fibers can be readily mixed.

Materials of fibers constituting non-woven fabric, woven fabric, and knitted fabric include, but are not limited to, cotton, hemp, silk, pulp, nylon, vinylon, polyester, polypropylene, polyethylene, cupra, acrylic, and polylactic acid. Non-woven fabric may be made not only of one type of fiber but also be of mixed plural types of fibers. It is preferable to select a material of fiber readily capable of wiping off dried matter sticking to a nozzle surface; however, mixing with fiber having a high water-absorbency such as rayon is suitable to impart a feature of absorbing extra liquid composition. A method of manufacturing a non-woven fabric wiping member will be described. Examples of the method of forming a non-woven fabric include, but are not limited to, wet, dry, spun-bond, melt-blown and flash spinning. Moreover, the non-woven fabric can be bonded by, for example, methods such as spun lace, needle punch, thermal bond, chemical bond, etc. In the spun lace method, jet water stream is sprayed onto accumulated fibers to entangle the fibers due to the pressure, thereby bonding the fibers like a sheet. The needle-punch method forms a non-woven fabric by stabbing a needle with a protrusion called a barb into accumulated fibers several ten times or more to mechanically intertwine the fibers.

The porosity of a wiping member obtained according to the following formula (1) is preferably from 0.60 to 0.99. A porosity in this range can enhance the ability of wiping sticky dried matter and makes a wiping member sufficiently hold a cleaning liquid.

$$\text{Porosity}=1-(\text{Appearance density/true density}) \quad (1)$$

In a case of sheet-shaped non-woven fabric, the "true density" is the true density of the fiber forming the sheet. The "apparent density" can be obtained by dividing the basis weight of the sheet-shaped material by thickness, i.e., (basis weight/thickness).

The wiping member preferably has a thickness of from 0.1 to 3.0 mm. A thickness in this range can enhance the ability of wiping sticky dried matter and makes a wiping member sufficiently hold a cleaning liquid.

Fiber with Projections

The fiber constituting a wiping member contains fiber with projections and other optional fiber having other forms. Fiber with projections of a wiping member enhances an ability of wiping off dried sticky matter of a liquid composition adhering to a nozzle surface and efficiently removes dried sticky matter even at a low line pressure. Damage to the nozzle surface is minimized by wiping off at a low line pressure at the contact portion between a wiping member and a nozzle surface so that degradation of discharging stability is minimized. In the case of a discharging head having a nozzle surface with a water-repellent film, the discharging stability caused by damage to a nozzle surface significantly deteriorates. It is thus more preferable to use the wiping member of the present embodiment.

The cross section perpendicular to the fiber axis of fiber with projections has projections and ditches alternately present side by side. It is preferable that multiple projections be present. Three or more projections are preferable, four or more, more preferable, five or more, further preferable, and six or more, particularly preferable. Also, 12 or less projections are preferable, 11 or less, more preferable, and 10 or less, further preferable. The wiping property is enhanced with projections in the range mentioned above. Branches of the projections are not counted as the number of projections.

The fiber with projections preferably has three or more regions enclosed by the perimeter of the cross section and the circumcircle and more preferably four or more regions. It is preferably 9 or under and more preferably 8 or under. The number of regions in the range mentioned above enhances the wiping property. The circumcircle of a cross section means the minimum circle of all the circles having a point of contact with the perimeter of the cross section.

The porosity of fiber with projections calculated according to the following formula is preferably from 20 to 80 percent, more preferably from 30 to 70 percent, further more preferably from 45 to 65 percent, and particularly preferably from 50 to 60 percent. "A" in the following formula represents the area of a cross section perpendicular to the fiber axis of fiber with projections. "B" in the following formula (2) represents the area of circumcircle in a cross section perpendicular to the fiber axis of fiber with projections. The area of hollow portions in fiber with projections is not counted as the area of the cross section mentioned above.

The porosity in the range mentioned above enhances the wiping property.

$$\text{Porosity}=(1-A/B)\times 100 \quad (2)$$

The projections of fiber with projections is continuously formed in the direction of the axis of fiber. These continuous projections make the range of the projections in contact with dried sticky matter adhering to a nozzle surface large, thereby enhancing the wiping property. The fiber with projections continuously having projections along the axis of fiber is not limited to the case where projections are formed all over the full length of fiber with projections but include the case where projections are partially formed in the full length.

The "projections are partially formed in the full length" is preferably 10 percent or more of the full length, more preferably 20 percent or more, further preferably 30 percent or more, further more preferably 40 percent or more, and particularly preferably 50 percent or more. Fiber other than the fiber with projections, such as fiber having a true circle or ellipsoidal cross section perpendicular to the fiber axis, is assumed to have a rough surface partially with projections. The projections of such fiber are not continuously formed in the direction of the axis of fiber and thus distinguished from the fiber with projections.

The shape of the cross section perpendicular to the axis of fiber with projections is described with reference to FIG. 5.

Figure 5:
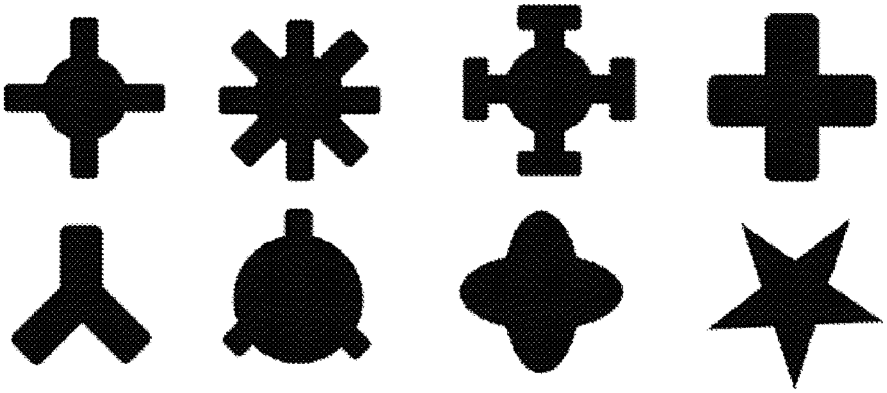
FIG. 5 is schematic diagrams illustrating examples of the shapes of the cross sections perpendicular to the fiber axes of fibers with projections.

FIG. 5 is schematic diagrams illustrating examples of the shapes of the cross sections perpendicular to the axis of fiber with projections. As illustrated in FIG. 5, the shape of the cross section is not particularly limited and includes a cross-type cross section, H-type cross section, T type cross section, Y type cross section, multi-fin type cross section. Fiber having a hollow portion, fiber having branched projections, and flat fiber in a cross section may be included. The method of checking the shape of the cross section perpendicular to the axis of fiber with projections is not particularly limited. One way of checking the shape is to embed fiber with projections with an embedding agent such as epoxy resin, prepare a cross section from it, and observe the cross section with a scanning electron microscope (SEM).

It is possible to manufacture fiber with projections by a known method. One way of manufacturing fiber with projections is to suitably design the shape of a cap for manufacturing fiber with projections and another is to divide fiber after spinning utilizing phase separation.

Fiber with projections or a sheet formed by using fiber with projections include, but are not limited to, Octa® manufactured by TEIJIN FRONTIER CO., LTD., Dilla manufactured by UNITIKA LTD., SOIERION Y, manufactured by KB SEIREN LTD., ARTIROSA™ and PENTAS™α manufactured by Toray Industries, Inc., CERES DRY® manufactured by TOYOBO CO., LTD., and PYUAS manufactured by KURARAY CO., LTD.

The fiber with projections preferably has a single fiber diameter of from 10 to 50 μm and more preferably from 20 to 30 The fiber with projections preferably has a fiber length of from 1 to 100 mm, more preferably from 20 to 80 mm, and furthermore preferably from 40 to 60 mm.

The proportion of fiber with projections to the mass of a wiping member is preferably 20 percent by mass or more and more preferably 40 percent by mass or more. All of the fiber constituting a wiping member can be fiber with projections.

Cleaning Liquid

The wiping device of the present embodiment may use a cleaning liquid during wiping. It is preferable that the cleaning liquid contain an organic solvent, a surfactant, water, and other optional components. The wiping member wipes off this cleaning liquid after the cleaning liquid is directly or indirectly applied to the nozzle surface so that the viscosity of dried sticky matter present on the nozzle surface decreases, thereby readily removing the dried sticky material. It is also preferable that the cleaning liquid storage container be filled with the cleaning liquid, mounted on the wiping device, and applied by a cleaning liquid application device.

Organic Solvent

The organic solvent has no particular limit and can be suitably selected to suit to a particular application and includes a water-soluble organic solvent as an example. The water-soluble organic solvent is not particularly limited and can be suitably selected to suit to a particular application. Examples include, but are not limited to, polyhydric alcohols, nitrogen-containing heterocyclic compounds, amides, amines, sulfur-containing compounds, propylene carbonates, ethylene carbonates, and polyol compounds having eight or more carbon atoms. These can be used alone or in combination.

Specific examples of the water-soluble organic solvent include, but are not limited to: polyhydric alcohols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethyl-2-imidazolidinone, ∈-caprolactam, and γ-butyrolactone; amides such as formamide, N-methylformamide, N,N-dimethylformamide, 3-methoxy-N,N-dimethyl propioneamide, and 3-buthoxy-N,N-dimethyl propioneamide; amines such as monoethanolamine, diethanolamine, and triethylamine; sulfur-containing compounds such as dimethyl sulfoxide, sulfolane, and thiodiethanol; propylene carbonate, and ethylene carbonate.

Polyol compounds having eight or more carbon atoms and glycol ether compounds are also suitable. Specific examples of the polyol compounds having eight or more carbon atoms include, but are not limited to, 2-ethyl-1,3-hexanediol and 2,2,4-trimethyl-1,3-pentanediol. Specific examples of the glycolether compounds include, but are not limited to, polyhydric alcohol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether and polyhydric alcohol arylethers such as ethylene glycol monophenylether and ethylene glycol monobenzylether.

The proportion of the organic solvent to the total amount of the cleaning liquid is preferably from 10.0 to 50.0 percent by mass and more preferably from 20.0 to 30.0 percent by mass.

Surfactant

Specific examples of the surfactant include, but are not limited to, polyoxyalkylene surfactants, silicone-based surfactants, fluorochemical surfactants, amphoteric surfactants, nonionic surfactants, and anionic surfactants. Of these, polyoxyalkylene surfactants and silicone-based surfactants are preferable. Polyoxyalkylene surfactants are particularly preferable in terms of wiping property of cleaning liquid for sticky fixed matter and storage stability of cleaning liquid. These can be used alone or in combination.

Examples of the polyoxyalkylene surfactant include, but are not limited to, polyoxyethylene distyrenated phenylether and polyoxyethylene polyoxypropylene alkylether.

Polyoxyalkylene surfactants can be synthesized or procured. Specific examples of the procurable product include, but are not limited to, EMULGEN A-60 (polyoxyethylene distyrenated phenyl ether), EMULGEN LS-106 (polyoxyethylene polyoxypropylene alkyl ether), EMULGEN LS-110 (polyoxyethylene polyoxypropylene alkyl ether) (higher alcohol-based ether-type nonionic surfactant, all manufactured by Kao Corporation). These can be used alone or in combination.

The silicone-based surfactant has no particular limit and can be suitably selected to suit to a particular application.

Specific examples include, but are not limited to, side-chain-modified polydimethyl siloxane, both end-modified polydimethyl siloxane, one-end-modified polydimethyl siloxane, and side-chain-both-end-modified polydimethyl siloxane. In particular, a polyether-modified silicone-based surfactant having a polyoxyethylene group or a polyoxyethylene polyoxypropylene group is particularly preferable because such a surfactant demonstrates good property as an aqueous surfactant.

It is possible to use a polyether-modified silicone-based surfactant as the silicone-based surfactant. A specific example is a compound in which a polyalkylene oxide structure is introduced into the side chain of the Si site of dimethyl silooxane.

Any suitable synthetic silicone-based surfactant can be used. Products available on the market are also usable. Products are available from BYK-Chemie GmbH, Shin-Etsu Silicone Co., Ltd., Dow Corning Toray Co., Ltd., NIHON EMULSION Co., Ltd., Kyoeisha Chemical Co., Ltd., and others.

The polyether-modified silicon-based surfactant has no particular limit and can be suitably selected to suit to a particular application. For example, a compound is usable in which the polyalkylene oxide structure represented by the following Chemical Formula S-1 is introduced into the side chain of the Si site of dimethyl polysiloxane.

(S-1)

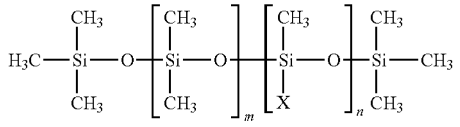

$X = -R(C_2H_4O)_a(C_3H_6O)_bR'$

In Chemical Formula S-1, "m", "n", "a", and "b" each, respectively independently represent integers, R represents an alkylene group, and R' represents an alkyl group.

Specific examples of the polyether-modified silicone-based surfactant include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Chemie GmbH), and TSF4440, TSF4452, and TSF4453 (all manufactured by GE Toshiba Silicone Co. Ltd.).

Specific examples of the fluorochemical surfactant include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because the fluorochemical surfactant does not readily produce foams.

Specific examples of the perfluoroalkyl sulfonic acid compounds include, but are not limited to, perfluoroalkyl sulfonic acid and salts of perfluoroalkyl sulfonic acid.

Specific examples of the perfluoroalkyl carbonic acid compounds include, but are not limited to, perfluoroalkyl carbonic acid and salts of perfluoroalkyl carbonic acid.

Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain, and salts of polyoxyalkylene ether polymers having a perfluoroalkyl ether group in its side chain. Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

The proportion of the surfactant is not particularly limited and can be suitably selected to suit to a particular application. For example, it is preferably from 0.001 to 5 percent by mass, more preferably from 0.05 to 5 percent by mass, and furthermore preferably from 0.1 to 3 percent by mass in terms of storage stability.

Water

As the water, for example, pure water such as deionized water, ultrafiltered water, reverse osmosis water, and distilled water and ultra pure water are suitable.

The proportion of the water is not particularly limited and can be suitably selected to suit to a particular application. For example, it is preferably from 20.0 to 80.0 percent by mass and more preferably from 30.0 to 60.0 percent by mass to the total amount of the cleaning liquid.

Other Components

The other optional components are not particularly limited and can be suitably selected to suit to a particular application. Examples include, but are not limited to, defoaming agents, preservatives and fungicides, pH regulators, and corrosion inhibitors.

Defoaming Agent

The defoaming agent has no particular limit. Examples include, but are not limited to silicon-based defoaming agents, polyether-based defoaming agents, and aliphatic acid ester-based defoaming agents. These can be used alone or in combination. Of these, silicone-based defoaming agents are preferable to achieve the effect of foam breaking.

Preservatives and Fungicides

The preservatives and fungicides are not particularly limited. A specific example is 1,2-benzisothiazoline-3-one.

Corrosion Inhibitor

The corrosion inhibitor has no particular limitation. Examples include, but are not limited to, acid sulfites and sodium thiosulfates.

pH Regulator

The pH regulator has no particular limit as long as it can control pH to 7 or greater. Specific examples include, but are not limited to, amines such as diethanol amine and triethanol amine.

Liquid Composition

Ink is described below as an example of the liquid composition carried in the liquid discharging device, It is preferable that an ink container as an example of the liquid container be filled with ink as an example of the liquid and mounted on the liquid discharging device. The liquid is not limited to ink, and may be, for example, a pre-processing liquid to be applied to a recording medium before ink discharging and a post-processing liquid to be applied to an ink-discharged surface of the recording medium after ink discharging.

Ink as an example of the liquid, preferably contains a coloring material, a resin, an organic solvent, a surfactant, water, and other optional components. The ink may be a clear ink containing a resin without containing a color material. As for the organic solvent, surfactant, water, and the other components such as a surfactant, the description thereof is omitted because the same components as those for the liquid composition can be used.

Coloring Material

The coloring material has no particular limitation and includes materials such as a pigment and a dye. The pigment includes an inorganic pigment or an organic pigment. These can be used alone or in combination. In addition, a mixed crystal can also be used as the coloring material.

Examples of the pigments include, but are not limited to, black pigments, yellow pigments, magenta pigments, cyan pigments, white pigments, green pigments, orange pigments, and gloss or metallic pigments of gold, silver, and others.

As the inorganic pigment, carbon black manufactured by known methods such as contact methods, furnace methods, and thermal methods can be used in addition to titanium oxide, iron oxide, calcium carbonate, barium sulfate, aluminum hydroxide, barium yellow, cadmium red, and chrome yellow.

Specific examples of the organic pigment include, but are not limited to, azo pigments, polycyclic pigments (e.g., phthalocyanine pigments, perylene pigments, perinone pigments, anthraquinone pigments, quinacridone pigments, dioxazine pigments, indigo pigments, thioindigo pigments, isoindolinone pigments, and quinophthalone pigments), dye chelates (e.g., basic dye type chelates and acid dye type chelates), nitro pigments, nitroso pigments, and aniline black. Of those pigments, pigments having good affinity with solvents are preferable. Also, hollow resin particles and hollow inorganic particles can be used. Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to: C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63, C.I. Pigment Green 1, 4, 7, 8, 10, 17, 18, and 36.

The dye is not particularly limited and includes, for example, acidic dyes, direct dyes, reactive dyes, basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the coloring material in the ink is preferably from 0.1 to 15 percent by mass and more preferably from 1 to 10 percent by mass to enhance the image density, fixability, and discharging stability.

The ink is obtained by introducing a hydrophilic functional group into a pigment to prepare a self-dispersible pigment, coating the surface of a pigment with a resin followed by dispersion, or using a dispersant to disperse a pigment.

One way of preparing a self-dispersible pigment by introducing a hydrophilic functional group into a pigment is to add a functional group such as a sulfone group and carboxyl group to a pigment (e.g., carbon) to disperse the pigment in water.

One way of dispersing a resin by coating the surface thereof is to encapsulate a pigment in a microcapsule to make it disperse in water. This can be referred to as a resin-coated pigment. In this case, all the pigments to be added to ink are not necessarily entirely coated with a resin. Pigments never or partially coated with a resin may be dispersed in the ink. When a dispersant is used, a known dispersant having a small or large molecular weight, represented by a surfactant, is used. It is possible to select an anionic surfactant, a cationic surfactant, a nonionic surfactant, an amphoteric surfactant, or others depending on a pigment. Also, a nonionic surfactant (RT-100, manufactured by TAKEMOTO OIL & FAT CO., LTD.) and a formalin condensate of naphthalene sodium sulfonate are suitable as the dispersant. Those can be used alone or in combination.

Resin

The type of the resin contained in the ink has no particular limit and can be suitably selected to suit to a particular application. Examples include, but are not limited to, urethane resins, polyester resins, acrylic-based resins, vinyl acetate-based resins, styrene-based resins, butadiene-based resins, styrene-butadiene-based resins, vinylchloride-based resins, acrylic styrene-based resins, and acrylic silicone-based resins. These can be used alone or in combination. Of these, urethane resins are preferable. It is preferable to use the resin as resin particle. It is possible to mix a resin emulsion in which such resin particles are dispersed in water as a dispersion medium with materials such as a coloring material and an organic solvent to obtain an ink.

The volume average particle diameter (mean volume diameter) of the resin particle is not particularly limited and can be suitably selected to suit to a particular application. The mean volume diameter is preferably from 10 to 1,000 nm, more preferably from 10 to 200 nm, and particularly preferably from 10 to 100 nm to achieve good fixability and image robustness. The mean volume diameter can be measured by using an instrument such as a particle size analyzer (Nanotrac Wave-UT151, manufactured by MicrotracBEL Corp.).

The proportion of the resin particle is not particularly limited and can be suitably selected to suit to a particular application. In terms of fixability and storage stability of ink, it is preferably from 1 to 30 percent by mass and more preferably from 5 to 20 percent by mass to the total amount of the ink.

Recording Medium

The recording medium to which the liquid is applied is not particularly limited. Plain paper, gloss paper, special paper, cloth, etc. are usable. Also, good images can be formed on a non-permeable substrate. To the recording medium, liquid can be at least temporarily attached. The non-permeable substrate has a surface with low moisture permeability and low absorbency and includes a material having many hollow spaces inside that are not open to the outside. To be more quantitative, the substrate has a water absorbency of 10 $mL/m^2$ or less within 30 $msec^{1/2}$ of the contact of the ink according to Bristow's method.

For example, plastic films such as vinyl chloride resin film, polyethylene terephthalate (PET) film, polypropylene film, polyethylene film, and polycarbonate film are suitably used as the non-permeable substrate.

The recording media are not limited to typical recording media and suitably include building materials such as wall paper, floor material, and tiles, cloth for apparel such as T-shirts, textile, and leather. The configuration of the paths through which the recording medium is conveyed can be changed to use materials such as ceramics, glass, and metal.

EXAMPLES

Next, the present disclosure is described in detail with reference to Examples but is not limited thereto.

Figure 6A:
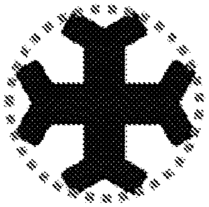
FIG. 6A is a first schematic diagram illustrating an example of a cross-section perpendicular to the fiber axis of the fibers used in the Examples and the circumcircle of the cross-section.
Figure 6B:
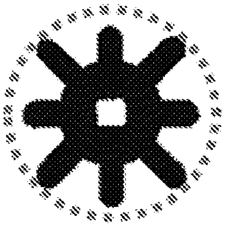
FIG. 6B is a second schematic diagram illustrating an example of a cross-section perpendicular to the fiber axis of the fibers used in the Examples and the circumcircle of the cross-section.
Figure 6C:
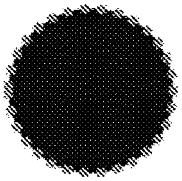
FIG. 6C is a third schematic diagram illustrating an example of a cross-section perpendicular to the fiber axis of the fibers used in the Examples and the circumcircle of the cross-section.

Preparation of Wiping Device and Wiping Member Examples 1 to 4 and Comparative Examples 1 and 2 Sheet-shaped unwoven fabric made of the materials shown in Table 1 was prepared and used as a wiping member. This wiping member was mounted on the wiping device illustrated in FIG. 3. Since Octa® (manufactured by TEIJIN FRONTIER CO., LTD.) used in Examples 3, 4, and 6 was fiber, it was processed to make unwoven fabric before used as wiping member. The shapes of the fiber used in Examples are described. FIGS. 6A to 6C are schematic diagrams illustrating the cross sections perpendicular to the fiber axes of the fibers used in Examples and the circumcircles of the cross sections. The cross section is represented in black and the circumcircle is represented in dotted gray line. FIG. 6A is a diagram illustrating fiber constituting Dilla D0903WPO (manufactured by UNITIKA LTD.), FIG. 6B is a diagram illustrating Octa® (manufactured by TEIJIN FRONTIER CO., LTD.), and FIG. 6C is a diagram illustrating fiber constituting Bemliese (manufactured by Asahi Kasei Corporation).

The prepared wiping member was evaluated on the wiping member and dischargeability described below. The results are shown in Table 1.

Wiping Property

Ink (RICOH Pro AR ink white, manufactured by Ricoh Co., Ltd.) at 0.1 ml was dripped on the nozzle plate of an inkjet head (MH5441, manufactured by Ricoh Co., Ltd.) and allowed to stand for 15 hours to prepare a nozzle plate to which dried sticky ink adhered. Cleaning liquid (RICOH Flushing Cartridge Type C2, manufactured by Ricoh Co., Ltd.) was applied to the prepared wiping member at 20 $\mu l/cm^2$, and thereafter the nozzle plate was wiped. The wiping conditions were: line pressure as shown in Table 1 and wiping speed of 50 mm/s. After the nozzle surface was wiped, the nozzle plate was visually checked to count the number of times of wiping required before the dried sticky ink was removed. The wiping member was evaluated on the wiping properties according to the following evaluation criteria. For the obtained results, the wiping members were determined as usable for practical purpose when graded C or above, preferable when graded B or above, and more preferable when graded A.

Evaluation Criteria

A: Dried sticky ink on nozzle plate was removed by five or less wiping operations.

B: Dried sticky ink on nozzle plate was removed by wiping operations six or seven times C: Dried sticky ink on nozzle plate was removed by wiping operations eight or nine times D: Dried sticky ink remained after wiping operations ten times Dischargeability The discharging head of an inkjet printer (RICOH Pro L5160, manufactured by Ricoh Co., Ltd.) having a wiping device carrying the prepared wiping member was subjected to weak head cleaning 10,000 times. The wiping conditions were: line pressures shown in Table 1. The discharging state was checked to evaluate dischargeability according to the following evaluation criteria. The nozzle surface of the discharging head mounted on the inkjet printer (RICOH Pro L5160, manufactured by Ricoh Co., Ltd.) had a water-repellent film. For the obtained results, the wiping members were determined as usable for practical purpose when graded C or above, preferable when graded B or above, and more preferable when graded A.

Evaluation Criteria

A: No discharging disturbance or non-discharging occurred

B: Discharging disturbance and non-discharging occurred at one or two nozzles

C: Discharging disturbance and non-discharging occurred at three to five nozzles D: Discharging disturbance and non-discharging occurred at six or more nozzles

TABLE 1

| | Wiping member | | | | |
|---|---|---|---|---|---|
| | Trade name of unwoven fabric or fabric | Manufacturer | Number of projections | Number of regions enclosed by perimeter of cross section and circumcircle | Porosity (percent) of fiber |
| Example 1 | Dilla D0903WPO | UNITIKA LTD. | 4 | 8 | 42 |
| Example 2 | Dilla D0903WPO | UNITIKA LTD. | 4 | 8 | 42 |

TABLE 1-continued

| | | | | | |
|---|---|---|---|---|---|
| Example 3 | Octa ® | TEIJIN FRONTIER CO., LTD. | 8 | 4 | 55 |
| Example 4 | Octa ® | TEIJIN FRONTIER CO., LTD. | 8 | 4 | 55 |
| Example 5 | Dilla D0903WPO | UNITIKA LTD. | 4 | 8 | 42 |
| Example 6 | Octa ® | TEIJIN FRONTIER CO., LTD. | 8 | 4 | 55 |
| Comparative Example 1 | Bemliese | Asahi Kasei Corporation | 0 | 0 | 0 |
| Comparative Example 2 | Bemliese | Asahi Kasei Corporation | 0 | 0 | 0 |

| | Line pressure | Evaluation result | |
|---|---|---|---|
| | (N/cm) at wiping | Wiping property | Discharegability |
| Example 1 | 1.7 | A | B |
| Example 2 | 0.6 | B | A |
| Example 3 | 1.7 | | |
| Example 4 | 0.6 | A | A |
| Example 5 | 2.0 | A | C |
| Example 6 | 2.0 | A | C |
| Comparative Example 1 | 1.7 | D | B |
| Comparative Example 2 | 0.6 | D | A |

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

This patent application is based on and claims priority to Japanese Patent Application No. 2020-048959, filed on Mar. 19, 2020, in the Japan Patent Office, the entire disclosure of which is hereby incorporated by reference herein.

REFERENCE SIGNS LIST

3 Carriage
4, **4*a*, 4*b*** Recording head
**4*n*** Nozzle
20 Maintenance recovery assembly
**20*b*** Wiping assembly
41. Nozzle plate
320 Sheet-shaped wiping member
400 Pressing roller
410 Delivery roller
420 Reel-up roller
430 Cleaning liquid application device
500 Foreign matter

The invention claimed is:

1. A wiping device, comprising:

a wiping member configured to wipe a nozzle surface of a discharging head configured to discharge a liquid composition from nozzles formed on the nozzle surface, the wiping member comprising a fiber with projections present in a cross section perpendicular to an axis of the fiber and continuous in a direction of the axis of the fiber.

2. The wiping device according to claim 1, further comprising a pressing device configured to press the wiping member to the nozzle surface.

3. The wiping device according to claim 1, wherein a line pressure is 1.7 N/cm or less at a contact portion between the wiping member and the nozzle surface during wiping of the nozzle surface by the wiping member.

4. The wiping device according to claim 1, wherein a line pressure is 0.6 N/cm or less at a contact portion between the wiping member and the nozzle surface during wiping of the nozzle surface by the wiping member.

5. The wiping device according to claim 1, wherein the fiber has three or more projections in the cross section.

6. The wiping device according to claim 5, wherein the fiber with projections has a porosity of from 20 to 80 percent.

7. The wiping device according to claim 1, wherein the cross section has three or more regions enclosed by a perimeter and a circumcircle of the cross section.

8. The wiping device according to claim 1, wherein the fiber with projections has a porosity of from 20 to 80 percent.

9. The wiping device according to claim 1, wherein the fiber with projections has a single fiber diameter of from 10 to 50 micrometers.

10. The wiping device according to claim 1, wherein the fiber with projections has a single fiber diameter of from 20 to 30 micrometers.

11. The wiping device according to claim 10, wherein the fiber with projections has a fiber length of from 20 to 80 micrometers.

12. The wiping device according to claim 1, wherein the fiber with projections has a fiber length of from 20 to 80 micrometers.

13. A liquid discharging device, comprising:

a discharging head; and a wiping device comprising:

a wiping member configured to wipe a nozzle surface of the discharging head configured to discharge a liquid composition from nozzles formed on the nozzle surface, the wiping member comprising a fiber with projections present in a cross section perpendicular to an axis of the fiber and continuous in the axis of the fiber.

14. The liquid discharging device according to claim 13, wherein the nozzle surface has a water-repellent film.

15. The liquid discharging device according to claim 13, wherein the fiber has three or more projections in the cross section, and wherein the fiber with projections has a porosity of from 20 to 80 percent.

16. The liquid discharging device according to claim 13, wherein the fiber with projections has a single fiber diameter of from 10 to 50 micrometers.

17. A wiping method, comprising:

wiping a nozzle surface of a discharging head configured to discharge a liquid composition from nozzles formed on the nozzle surface, with a wiping member, wherein the wiping member includes a fiber with projections present in a cross section perpendicular to an axis of the fiber and continuous in a direction of the axis of the fiber.

18. The wiping method according to claim 17, wherein a line pressure is 1.7 N/cm or less at a contact portion between the wiping member and the nozzle surface during wiping of the nozzle surface by the wiping member.

19. The wiping method according to claim 17, wherein a line pressure is 0.6 N/cm or less at a contact portion between the wiping member and the nozzle surface during wiping of the nozzle surface by the wiping member.

20. The wiping method according to claim 17, wherein the fiber with projections has a single fiber diameter of from 10 to 50 micrometers.

* * * * *